Nov. 30, 1926.

J. W. BRYCE 1,608,837

TABULATING CARD PRINTER DEVICE

Filed May 21, 1924     5 Sheets-Sheet 1

Inventor
James W. Bryce
By his Attorneys
Cooper, Kerr & Dunham

Nov. 30, 1926.
J. W. BRYCE
1,608,837
TABULATING CARD PRINTER DEVICE
Filed May 21, 1924   5 Sheets-Sheet 2

Inventor
James W Bryce
By his Attorneys
Cooper, Kerr & Dunham

Nov. 30, 1926.
J. W. BRYCE
TABULATING CARD PRINTER DEVICE
Filed May 21, 1924    5 Sheets-Sheet 4
1,608,837
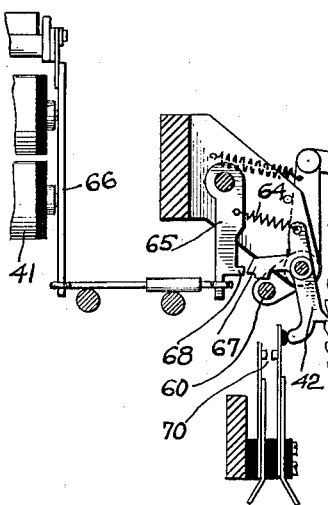
Fig. 4.
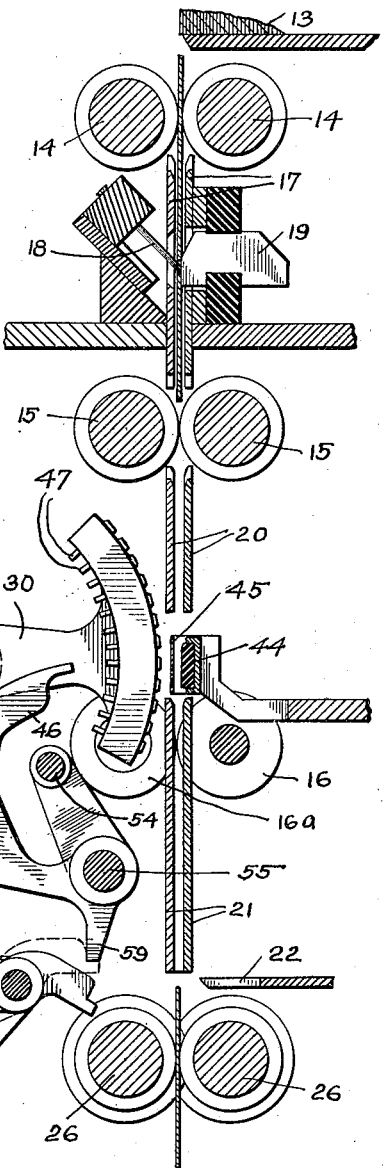
Fig. 5.
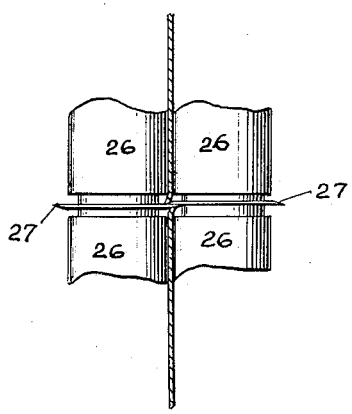
Inventor
James W. Bryce
By his Attorneys
Cooper, Kerr & Dunham Nov. 30, 1926.

J. W. BRYCE 1,608,837

TABULATING CARD PRINTER DEVICE

Filed May 21, 1924  5 Sheets-Sheet 5

Inventor
James W. Bryce
By his Attorneys
Cooper, Kerr & Dunham

Patented Nov. 30, 1926.

1,608,837

UNITED STATES PATENT OFFICE.

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY.

TABULATING-CARD PRINTER DEVICE.

Application filed May 21, 1924. Serial No. 714,918.

In the tabulating machine art it is the common practice to perforate record cards with statistical data in the form of perforations. These record cards are afterwards utilized in connection with sorting and tabulating machines. In sorting machines the cards are separated into groups and subsequently the sorted cards may be passed through tabulating machines and data derived therefrom and accumulated or listed or both accumulated and listed. The general practice with these cards has been to perforate them in punching devices. Reading of the perforated cards while easy for an experienced person is a matter of some difficulty for one who is not familiar with the general system. It has accordingly been the practice to print the cards first with characters such as the numbers, digits, etc., and the punchings on the cards are made directly on the spaces in which the corresponding printed character is placed. It therefore follows that after a card is punched the printed number designating a particular hole is punched out and the method of reading the card consists in interpreting the omitted characters rather than in reading directly visible characters. Some efforts have been made to provide machines for perforating which in addition to perforating print a record on a card. Such machines have not come into general use since it has been very difficult to effect both printing and perforating on account of the extra power required for effecting these operations simultaneously.

According to the present invention it is proposed to perforate the record cards in the usual manner in any suitable punching mechanism. Subsequently if it is desired to have certain cards with printed data thereon indicative of the perforations the cards are passed through the machine illustrated in the present application where they are successively printed with the sensed data as derived from the perforations already made in the cards. This printing may be conventionally disposed in one line at the top of or adjacent the top of the card and, furthermore, if desired, the machine provides for the transition of the printing from one field or card to another. In other words, it is not only possible to print the characters directly over the perforations in the card to which they correspond but it is also possible to offset the printing with respect to the perforations. If desired, the machine can be arranged to print characters corresponding to certain perforated characters and omit the printing of characters corresponding to other perforations. Thus cards may be perforated in the left hand zone or field and the printing of these corresponding perforations may be made at the right hand side of the card. The machine also contemplates the provision of means for severing the card into two parts after cutting is effected. Thus it is possible to use one side of the card as a printed receipt or stub.

Referring to the drawings,

Fig. 4 is a detailed enlarged sectional view of certain of the parts shown in Fig. 2 but in moved position.

Fig. 5 is a detail view of the knife or cutting mechanism for severing the cards into two parts.

Fig. 8 is a view showing a card after it has passed through the machine with the printed data which has been placed thereon by the machine.

Figure 1:
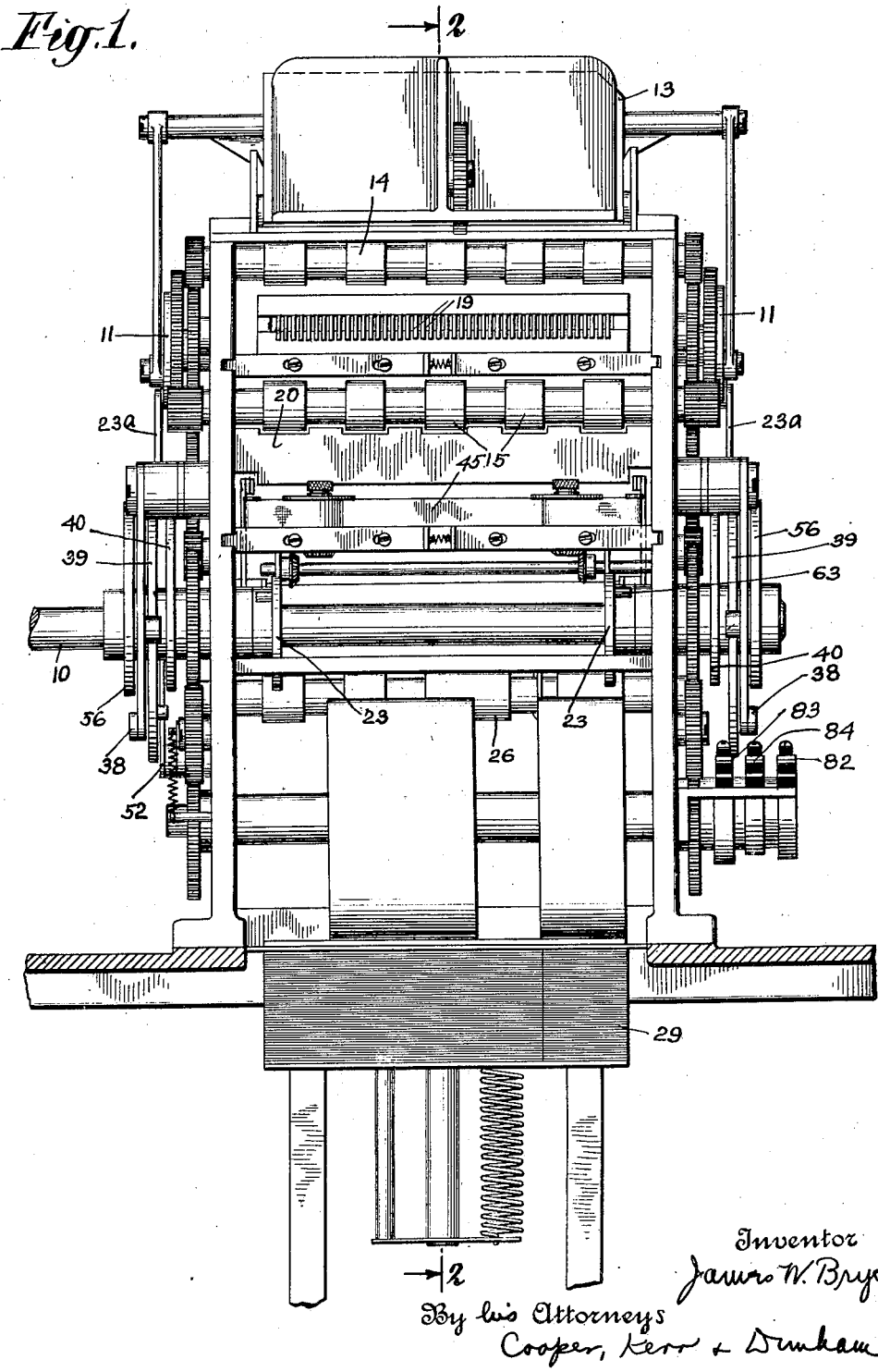
Fig. 1 illustrates a front elevation of the machine.
Figure 2:
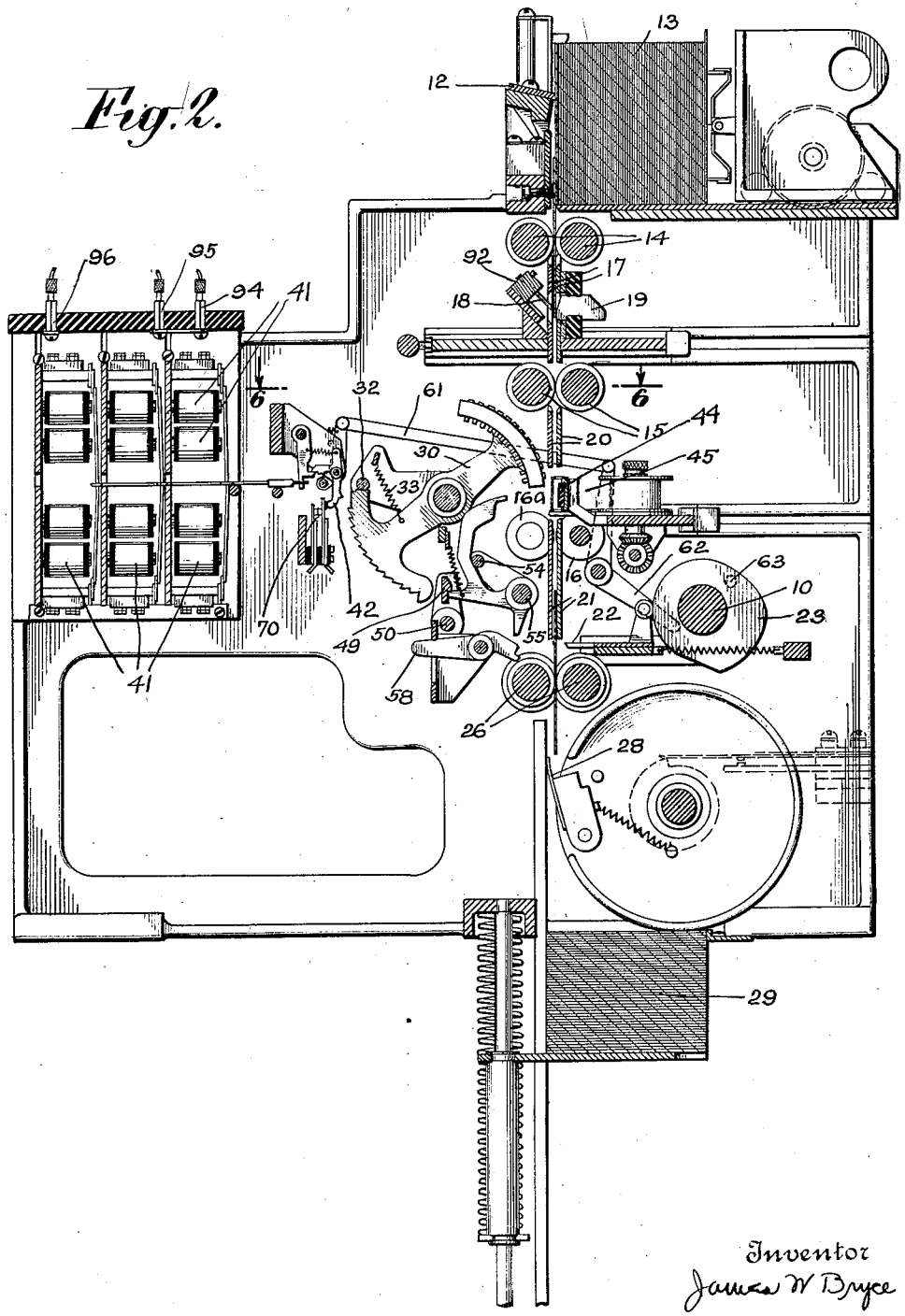
Fig. 2 is a vertical sectional view taken on lines 2—2 of Fig. 1.
Figure 3:
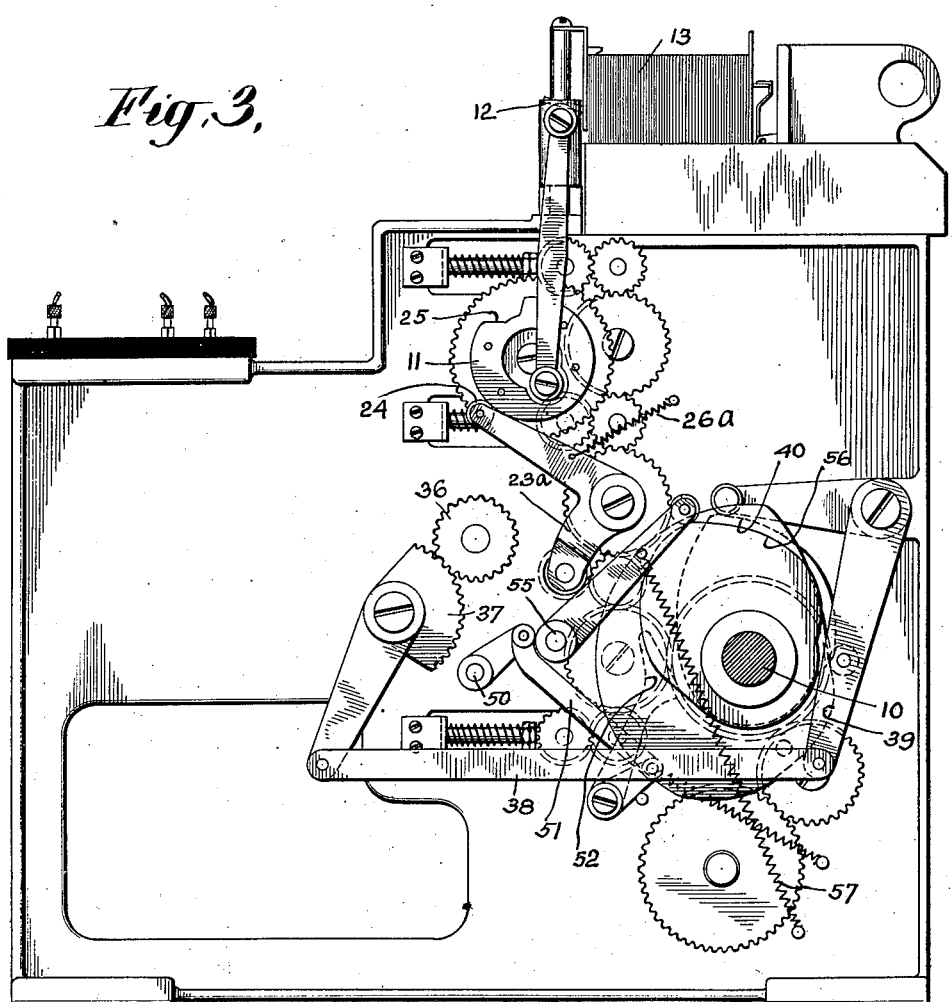
Fig. 3 is a side elevation of the machine.

In more detail, 10 represents the main drive shaft of the machine. This may be driven in any suitable manner as by an electric motor. From shaft 10 a suitable driving train shown in Fig. 3 is provided which drives disks 11 and actuates the picker mechanism 12. This reciprocating picker mechanism is adapted to advance one record card at a time from the supply stack or magazine 13. The supply magazine is of conventional construction being provided with suitable means for pressing the cards towards the picker mechanism 12. A suitable gear train shown in Fig. 3 also drives the feed rolls 14, 15, 16, and 16ª. The card which is advanced by the picker passes into the bight of the feed rolls 14 and subsequently advances between guides 17 to the analyzing or perforating reading devices which comprise brushes 18 and contact blocks 19. These brushes and contact blocks are of conventional construction such as are commonly used in electrically controlled tabulating machines. After passing the analyzing brushes the cards pass into feed rolls 15 which advance each card between the guides 20. The cards are subsequently advanced by feed rolls 16$^a$, 16, down between guides 21. Just before the lower edge of a card reaches the guides 21 a card stop or abutment 22 is advanced by means of the cam 23 shown in Fig. 2. This cam is disposed upon the main cam shaft 10 of the machine. This card stop or abutment arrests the advancing card and during the time it is arrested for receiving the printed impression means are provided for withdrawing feed rolls 16$^a$ from contact with the card to thus suspend the forward feeding of the card until the card stop 22 is withdrawn. The means for thus suspending the operation of the feed rolls 16$^a$, 16, comprises a bell crank member 23$^a$ (Fig. 3) and pivotal rolls 16$^a$. The upper end of the bell crank member carries a follower roller 24 which cooperates with the periphery of the disk 11 and at the proper time in the cycle of the machine is drawn into a notch 25 in said disk by means of a suitable spring 26$^a$. In this way the feed rolls 16$^a$ are rocked to the left from the position shown in Fig. 2 out of contact with the surface of the card. Subsequently after the abutment 22 is withdrawn the bell crank 23 is rocked in a counterclockwise direction by the rotation of disk 11 thus displacing feed rolls 16$^a$ against the card and causing it to cooperate with rolls 16 to feed the card forward to the cutting rolls 26. These cutting rolls 26 are provided with interacting knives 27 (see Fig. 5). They cooperate to sever the card into two halves. The position of these knives may be changed to suit the particular card which is being handled. If desired, they may be placed so as to cut the card into a long body portion and a short stub or in certain instances they may be omitted altogether and deliver an uncut card. From cutter rolls 26, if such are employed, the cards advance to a stacker 28 which is of conventional form. This stacker is driven from the main drive shaft of the machine by the gear train shown in Fig. 3. The stacker operates to discharge the cards into a discharge magazine 29.

For effecting the printing on the record cards as they successively pass through the machine a plurality of pivot type sectors 30 are provided. These sectors are all loosely mounted upon a supporting shaft 31. Also mounted on this shaft is a combined actuating and restoring bail structure 32. The individual sectors 30 are connected to this bail by means of tension springs 33. Thus upon the clockwise rocking of the bail 32 the springs 33 will rock the sectors 30 concurrently in a clockwise direction. The sectors may be arrested at any point in their travel and subsequently the springs 33 will elongate and permit the further movement of the bail 32. Upon the reverse rocking of bail 32 a suitable cross rod carried by this bail structure will contact with the sectors and positively rock them in a counterclockwise direction. For rocking the bail 32 the following mechanism is provided.

Figure 6:
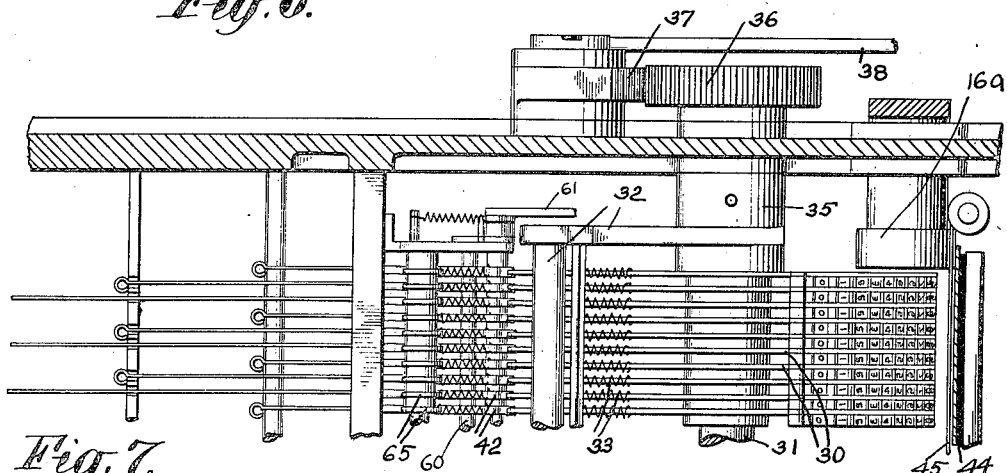
Fig. 6 is a detail view taken substantially on line 6—6 of Fig. 2.

Referring to Fig. 6, bail 32 has connected to it or integral therewith a collar-like member 35 which is fast to the shaft 31. Fast on this shaft there is also provided a gear 36 which meshes with the sector 37. This sector at the proper time in the cycle in the machine is actuated by a linkage 38 (see Fig. 3), the linkage extending to a connection with follower rolls which cooperate with cams 39 and 40 which are fast to the main shaft 10.

The arrangement and timing of the parts is such that the pivot type sectors 30 are rocked under the influence of the springs 33 in a clockwise direction synchronously with the movement of a card past the analyzing or sensing brushes 18. If a perforation at, say, the 5 position on the card is under the reading or sensing brushes the corresponding type representing 5 will be at the printing line. The establishment of a circuit through the index point perforations by the brushes is adapted to energize a magnet 41. There are a number of these magnets 41 corresponding to the different columns in the card, each magnet being related to a corresponding type sector 30. The energization of any magnet is adapted to release a pawl device 42 and allow it to engage one of the ratchet teeth 43. After pawl 42 has engaged the ratchet teeth 43 further movement of the type sector 30 in a clockwise direction is prevented. Type sectors 30 are all positioned for printing during the passage of a card past the brushes. Subsequently these type sectors are held during the period that a card passes from the analyzing station to the printing station and during the printing cycle.

Referring to Fig. 4, 44 designates a printing platen disposed at the printing line on the machine. Over this printing platen and spaced therefrom is the usual inking ribbon 45. The inking ribbon devices are of conventional form and require no detailed description.

For each type sector 30 there is an individual hammer 46 which is adapted to strike the particular type 47 on the type sector which is at the printing line. The hammers 46 are actuated by the springs 48 and are tripped by the retaining bail 49, which bail is mounted on a shaft 50. Tripping of the hammers is effected at the proper time in the cycle by rocking shaft 50. This shaft is rocked by a linkage 51 (Fig. 3) which extends to a follower member 52 cooperating with a suitable cam on the shaft 10. For restoring and relatching the hammers a bail 54 is provided fast on shaft 55, which shaft in turn is rocked by a cam 56 on shaft 10. Prior to the striking movement of the hammers bail 54 is rocked clear of the hammers by means of a suitable spring 57. To suppress the printing on any desired columns suitable hammer locking devices 58 may be provided. These hammer locks 58 when swung to the dotted line position (Fig. 4) engage depending tails 59 on the hammers and prevent their swinging forward when they are unlatched by the latching bail 49. These hammer lock devices may be selectively operated at will to suppress printing at any desired columns on the card.

Before the type sectors 30 can be restored in a counterclockwise direction by the rocking of bail 32 it is necessary that pawls 42 be disengaged from ratchet teeth 43. For this purpose a restoring bail 60 (Fig. 4) is provided, which bail is adapted to be rocked counterclockwise by a linkage 61 which extends to and connects with a finger 62 (Fig. 2) adapted to be struck by a pin 63 carried on cam 23. The rocking of bail 60 not only positively restores the pawls 42 but also through springs 64 exerts stress on the pivoted member 65 and thereby moves the armature 66 away from the magnets 41. Subsequently the shoulders 67 on pawls 42 will engage other shoulders 68 on member 65 and thereby latch the pawls 42 in a position in which they can be again tripped upon the energization of magnets 41.

In devices of this sort it is also necessary that the circuits through the index point perforations in the cards to magnets 41 be interrupted before the brushes leave the perforations in order to prevent arcing at the brushes. Referring to Figs. 2 and 4, there is associated with each pawl 42 a pair of contacts 70, which contacts are normally held closed by the pawl 42 when the same is in the latter position as shown in Fig. 2. Immediately upon the energization of magnet 41 and the tripping of pawl 42, the pawl 42 swings in a counterclockwise direction and permits contacts 70 to open thus interrupting the circuit to corresponding magnet 41 before the brush 18 leaves the perforation in the card.

Figure 7:
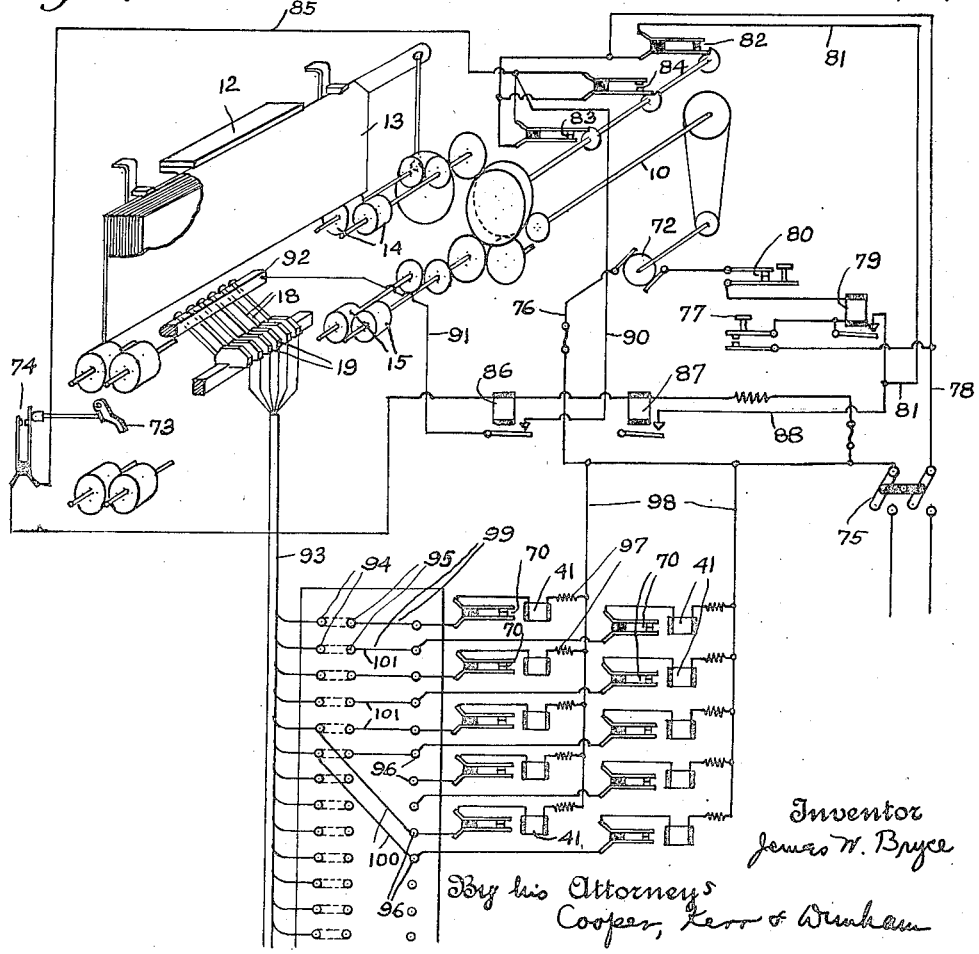
Fig. 7 is a circuit diagram of the machine showing the method of cross-plugging to permit printing in certain columns of records derived from other columns of the card.

Referring now to the circuit diagram (Fig. 7), certain of the mechanical parts are shown in a diagrammatic manner in this view. In this figure 72 is the driving motor which by a suitable belt and pulley connection drives the main drive shaft 10 of the machine. This shaft through suitable gearing drives the picker devices 12, which advances the record cards one at a time from stack 13 through the feed rolls and past the cooperating brushes and contact blocks 18 and 19. At such times when the cards are passing the brushes the usual card lever 73 is pressed back by the cards thus closing card lever contacts 74.

To start the machine into operation the operator first closes main line switch 75, thereupon start key 77 is depressed which, upon the closure of its contacts, establishes a circuit from line 78 through start key 77, motor relay magnets 79, emergency stop key contacts 80 now closed, to the motor 72 and back through wire 76 to source. The energization of the motor relay 79 establishes a holding circuit for the motor 72 through the armature of motor relay magnet 79, through line 81, through cam contacts 82 which are closed after the motor has rotated the parts, thence back through wire 78 to source. Cards now pass downwardly through the feed rolls and close the card contacts 74. Cam contacts 83 and 84 are make and break cams generally used in apparatus of this sort and serve to establish a circuit 85 to the card lever contacts 74 and to interrupt this circuit once per card cycle. The closure of the card lever contacts 74 when circuit 85 is established energizes the printer magnet control relay 86 and motor control relay magnet 87, current flowing from these magnets back to source. The attraction of the armature of motor control relay magnet 87 establishes another holding circuit for the driving motor 72 through a line 88 and thence through motor relay 79 and through the rest of the circuit as previously traced. This holding circuit maintains the machine in operation when cam contacts 82 break once per card cycle. The purpose of the contacts 82 is to interrupt the printing operation upon deenergization of the motor control relay 87 after the last card has passed through the machine and permitted contacts 74 to open.

The energization of the printer magnet control relay 86 attracts its armature and closes a circuit 90 supplied from the make and break contacts 84, 83. From the wire 90 current flows through the armature of relay 86 thence through line 91 to the common brush bar 92. From this brush bar current flows through the brushes 18 upon the passage of index points thereunder to contact blocks 19. These contact blocks are connected by suitable cable wires 93 to dual plugboard sockets 94, 95. On the plugboard there are other sockets 96 which are connected to the contacts 70. Contacts 70 are wired in series with the magnet 41, the usual controlling resistances 97 being provided in these magnet circuits and the return circuit for the magnets to the switch 75 is provided through suitable common return wires 98 which connect to wires 76.

If it is desired to print in the corresponding columns in which the perforation has occurred plug connections such as 99 may be provided connecting plug sockets 95, 96, in corresponding columns. If it is desired to offset the printing the plugging connections may be arranged as by wires 100 from plug sockets 94 to other plug sockets 96 out of alignment therewith.

It will be understood that it is also possible to duplicate printed data derived from certain columns at two places upon the printed card. This may be effected by conjointly utilizing dual plug connections such as 100 and 101, the latter connecting to sockets 95 and the former connecting to corresponding sockets 94. It will also be understood that if it is desired to suppress printing entirely of the data sensed by any particular group of brushes it is only necessary to entirely omit the plug connections, in which case the circuit to the printing magnets will be broken entirely. In the event that there are no plug connections the sectors will move to their extreme limit positions, in which case there will be no type 47 in alignment with the actuating hammers 46 upon their striking operation. Consequently there will be no number printed.

The cross-plugging arrangement illustrated finds particular utility in connection with the card severing means 27. By cross-plugging it is possible to print certain data on the top of the card at one side and to repeat this same data upon the other side of the card. Then after the card is severed one part of the card will contain corresponding printed data to the other part of the the card. It will be appreciated that the stub and main portion of the card may contain in part duplicate data and in part different data as desired.

What I claim is—

1. A tabulating card printing apparatus comprising means for feeding cards through the machines, means for reading perforations in said cards while the latter are in motion, and means for printing on said cards data derived from the perforations therein.

2. A tabulating card printing apparatus comprising means for feeding a succession of cards therethrough, means for sensing the perforations in said cards, means controlled by the aforesaid means for printing on each card printed characters indicative of the perforated data thereon, and means for transposing the printed data to a different field or different columnar position on the card than that from which controlling perforated data is derived.

3. A tabulating and printing apparatus comprising means for successively feeding a series of perforated cards, means for successively reading the perforations in each passing card, means for printing corresponding printed records on each passing card indicative of the perforations therein, and means for suppressing at will the printing of records derived from certain card fields.

4. A tabulating card printing apparatus comprising means for successively feeding a succession of cards, means for reading the perforations therein, means for printing on each card from which readings are taken of the perforations therein, data indicative of the perforations therein and means for severing the printed cards into multiple portions after the same have been printed.

5. A tabulating card printing apparatus comprising means for successively feeding cards therethrough, means for sensing the perforated data thereon, printing devices for printing on each card records corresponding to the perforations therein, and means for controlling said printing devices from said perforation reading means, said means having provisions for permitting the duplicating of like printed data upon different card zones.

6. A tabulating card printing machine comprising means for reading successively the perforations of a series of record cards, means for successively printing on each card data derived from the perforations in the same card, means for selectively transposing the printing to any desired zone on the card, said means permitting the printing of the data in columnar alignment with the perforations or in part out of alignment as desired.

7. A tabulating card printing apparatus comprising means for feeding a succession of cards through the machine, means for sensing perforations in the cards while the latter are in motion through the machine, means for arresting the cards temporarily to permit printing thereon and means controlled by the aforesaid sensing means for printing data upon the cards while the latter are temporarily at rest.

8. A tabulating card printing apparatus comprising means for feeding a succession of cards through the machine, means including brushes for sensing the perforations in the cards while the latter are in motion, a plurality of type sectors displaceable synchronously with the moving cards, magnet devices for arresting the type sectors in accordance with the perforations therein and means for taking a record from the type carried by said sectors and impressing the same upon the card from which the corresponding perforations appear.

9. A card printing apparatus including means for reading the perforations in each of a succession of cards and for printing the individual cards with data corresponding to the said perforations, means for transposing the printing of any desired data from the columns or zones in which readings are taken to any other selected zones or columns in which printing is desired to be effected.

10. A card printing apparatus including in combination, means for reading the perforations in each of a succession of cards and for printing the individual cards with data corresponding to said perforations, means for transposing the printing of selected data from the column or zone in which readings are taken to other selected columns or zones in which printing is desired to be effected, said means having provisions for permitting the repeating of the printing of like data derived from perforations in certain zones, in a plurality of different zones on the card and means for severing the card into a plurality of portions.

11. A tabulating card printing apparatus comprising in combination, means for reading the perforations in each of a succession of cards and for printing each card from which perforations are read with data corresponding to the perforations therein and means for severing each printed card into a stub and main portion.

12. A tabulating card printing apparatus including in combination, means for reading the perforations of each of a series of perforated record cards and for printing each card with data corresponding to the perforations therein, said means having provisions for printing certain like data derived from a single perforated zone upon different and spaced zones upon the cards, and means for severing each card into a stub and main portion, each of which contains the like designating data.

13. A tabulating card printing apparatus comprising means for feeding a series of perforated cards in succession, means for printing upon each card data designating the perforations therein, electromagnetic means for controlling the said printing operations, and brush reading devices cooperating with the record card perforations for controlling said electromagnetic devices.

14. A tabulating card printing apparatus comprising means for feeding a series of perforated cards, means for sensing the perforations therein while the cards are in motion, means for displacing a series of type carriers synchronously with the passage of each card past the sensing means, means for individually arresting the type carriers by said sensing means, means for temporarily stopping each card with its record receiving zone at the printing line of said type carriers, means for impressing a record from the type on said carriers upon each said card while arrested, and means for thereafter discharging the printed card from the machine.

15. A tabulating card printing apparatus, comprising means for feeding a series of perforated cards therethrough, means for sensing the perforations therein while the cards are in motion therethrough, means for differentially positioning a series of type carriers to bring the type of value determined by the sensing means to the printing line, and means operative while the record receiving zone of each card is at the printing line for taking a record from said type.

In testimony whereof I hereto affix my signature.

JAMES W. BRYCE.